(12) United States Patent
Swartz et al.

(10) Patent No.: US 10,350,877 B2
(45) Date of Patent: Jul. 16, 2019

(54) METHODS FOR PHOTOSCULPTURE

(71) Applicant: Impossible Objects, LLC, Northbrook, IL (US)

(72) Inventors: Robert Swartz, Highland Park, IL (US); Stephen Ness, San Francisco, CA (US); Eugene Gore, Des Plaines, IL (US); Buckley Crist, Wilmette, IL (US)

(73) Assignee: Impossible Objects, Inc., Northbrook, IL (US)

( * ) Notice: Subject to any disclaimer, the term of this patent is extended or adjusted under 35 U.S.C. 154(b) by 267 days.

(21) Appl. No.: 15/211,972

(22) Filed: Jul. 15, 2016

(65) Prior Publication Data

US 2016/0339645 A1    Nov. 24, 2016

Related U.S. Application Data

(63) Continuation of application No. 14/199,603, filed on Mar. 6, 2014, now Pat. No. 9,393,770.
(Continued)

(51) Int. Cl.
*B29C 67/00* (2017.01)
*B33Y 50/02* (2015.01)
(Continued)

(52) U.S. Cl.
CPC ............ *B33Y 50/02* (2014.12); *B29C 64/141* (2017.08); *B29C 64/153* (2017.08); *B29C 64/165* (2017.08); *B29C 64/35* (2017.08); *B29C 64/386* (2017.08); *B32B 5/022* (2013.01); *B32B 5/024* (2013.01); *B33Y 10/00* (2014.12); *B33Y 30/00* (2014.12); *B33Y 50/00* (2014.12);
(Continued)

(58) Field of Classification Search
CPC ......... B33Y 10/00; B33Y 30/00; B33Y 50/00; B33Y 50/02
See application file for complete search history.

(56) References Cited

U.S. PATENT DOCUMENTS

| 3,431,166 A | 3/1969 | Mizutani |
| 4,312,268 A | 1/1982 | King et al. |

(Continued)

OTHER PUBLICATIONS

Non-Final Rejection in U.S. Appl. No. 14/566,661 ("Tow Stabilization Method and Apparatus"), dated Mar. 21, 2017.
(Continued)

*Primary Examiner* — Ryan M Ochylski
(74) *Attorney, Agent, or Firm* — Flachsbart & Greenspoon; Robert P. Greenspoon

(57) ABSTRACT

A 3D object (the "New Object") is fabricated layer by layer by 3D printing. The shape and relative dimensions of the various parts of the New Object match that of another 3D object (the "Target Object"). In addition, the exterior of the New Object appears to be a photographic likeness of the Target Object. The "photographic" likeness is created by variations in visual characteristics of materials in the layers comprising the New Object, and in particular by variations at or near the surface of the New Object. Thus, the photographic likeness is an integral part of these layers comprising the New Object. An object is scanned, from which a texture map is obtained. A CAD model is sliced into slices (bit maps files) which are then colored by a program with the boundary to match the color or gray scale to color the appropriate pixels, derived from the texture map.

17 Claims, 11 Drawing Sheets

Related U.S. Application Data

(60) Provisional application No. 61/773,810, filed on Mar. 6, 2013.

(51) Int. Cl.

| | | |
|---|---|---|
| *B32B 5/02* | (2006.01) | |
| *B33Y 10/00* | (2015.01) | |
| *B33Y 50/00* | (2015.01) | |
| *B33Y 30/00* | (2015.01) | |
| *G05B 19/4099* | (2006.01) | |
| *B29C 64/141* | (2017.01) | |
| *B29C 64/153* | (2017.01) | |
| *B29C 64/165* | (2017.01) | |
| *B29C 64/386* | (2017.01) | |
| *B29C 64/35* | (2017.01) | |
| *B29K 105/00* | (2006.01) | |

(52) U.S. Cl.
CPC .... *G05B 19/4099* (2013.01); *B29K 2105/251* (2013.01); *G05B 2219/35134* (2013.01); *Y02P 90/265* (2015.11)

(56) References Cited

U.S. PATENT DOCUMENTS

| | | | |
|---|---|---|---|
| 4,393,389 | A | 7/1983 | Rasekhi et al. |
| 4,453,694 | A | 6/1984 | Andreasson |
| 4,863,538 | A | 9/1989 | Deckard |
| 5,176,949 | A | 1/1993 | Allagnat et al. |
| 5,204,055 | A | 4/1993 | Sachs et al. |
| 5,260,009 | A | 11/1993 | Penn |
| 5,340,656 | A | 8/1994 | Sachs et al. |
| 5,364,657 | A | 11/1994 | Throne |
| 5,369,192 | A | 11/1994 | Ko et al. |
| 5,514,232 | A | 5/1996 | Burns |
| 5,637,175 | A | 6/1997 | Feygin et al. |
| 5,876,550 | A | 3/1999 | Feygin et al. |
| 5,988,959 | A | 11/1999 | Sugata |
| 6,147,138 | A | 11/2000 | Hochsmann et al. |
| 6,161,995 | A | 12/2000 | Wakazono et al. |
| 6,471,800 | B2 | 10/2002 | Jang et al. |
| 6,551,038 | B1 | 4/2003 | Sugata et al. |
| 6,596,224 | B1 | 7/2003 | Sachs et al. |
| 6,632,054 | B2 | 10/2003 | Geiger et al. |
| 6,740,185 | B2 | 5/2004 | Baldwin |
| 6,780,368 | B2 | 8/2004 | Liu et al. |
| 8,377,547 | B2 | 2/2013 | Noguchi et al. |
| 2002/0104935 | A1 | 8/2002 | Schweizer |
| 2004/0070582 | A1 | 4/2004 | Smith et al. |
| 2004/0112523 | A1 | 6/2004 | Crom et al. |
| 2005/0059757 | A1 | 3/2005 | Bredt et al. |
| 2006/0061618 | A1 | 3/2006 | Hernandez et al. |
| 2007/0241482 | A1 | 10/2007 | Giller et al. |
| 2008/0006958 | A1 | 1/2008 | Davidson |
| 2008/0260954 | A1 | 10/2008 | Paton et al. |
| 2009/0255428 | A1 | 10/2009 | Stiel |
| 2009/0321979 | A1 | 12/2009 | Hiraide |
| 2010/0302326 | A1 | 12/2010 | Morohoshi et al. |
| 2011/0045724 | A1 | 2/2011 | Bahukudumbi |
| 2011/0101564 | A1 | 5/2011 | Keenihan et al. |
| 2011/0121491 | A1 | 5/2011 | Costabeber |
| 2013/0171431 | A1 | 7/2013 | Swartz et al. |
| 2014/0238173 | A1 | 8/2014 | Swartz et al. |
| 2014/0257549 | A1 | 9/2014 | Swartz et al. |
| 2015/0137423 | A1 | 5/2015 | Ding |
| 2015/0158246 | A1 | 6/2015 | Swartz et al. |
| 2015/0231825 | A1 | 8/2015 | Swartz et al. |
| 2016/0082657 | A1 | 3/2016 | Swartz et al. |
| 2016/0082658 | A1 | 3/2016 | Swartz et al. |
| 2016/0082695 | A1 | 3/2016 | Swartz et al. |
| 2016/0339645 | A1 | 11/2016 | Swartz et al. |

OTHER PUBLICATIONS

Non-Final Rejection in U.S. Appl. No. 14/199,603 ("Methods and Apparatus for Photosculpture"), dated Apr. 12, 2016.
Restriction Requirement in U.S. Appl. No. 14/566,661 ("Tow Stabilization Method and Apparatus"), dated Dec. 9, 2016.
Restriction Requirement in U.S. Appl. No. 14/703,372 ("Methods and Apparatus for Three Dimensional Printed Composites Based on Flattened Substrate Sheets"), dated Jul. 25, 2016.
Non-Final Rejection in U.S. Appl. No. 14/703,372 ("Methods and Apparatus for Three Dimensional Printed Composites Based on Flattened Substrate Sheets"), dated Dec. 22, 2016.
International Search Report and Written Opinion in International Application No. PCT/US16/62319 ("Additive Manufacturing Method and Apparatus"), dated Jan. 23, 2017.
International Search Report and Written Opinion in International Application No. PCT/US16/62356 (". . . Metal Matrix Composites . . . "), dated Jan. 23, 2017.
Extended European Search Report in EP20140757160 ("Method and Apparatus for Three-Dimensional Printed Composites"), dated Jul. 4, 2016.
Restriction in U.S. Appl. No. 14/190,912 ("Methods and Apparatus for Construction of Machine Tools"), dated Dec. 1, 2015.
Restriction in U.S. Appl. No. 14/190,912 ("Methods and Apparatus for Construction of Machine Tools"), dated Jun. 24, 2016.
Non-Final Rejection in U.S. Appl. No. 14/190,912 ("Methods and Apparatus for Construction of Machine Tools"), dated Oct. 3, 2016.
International Search Report for PCT/US12/52946 ("Methods and Apparatus for 3D Fabrication"), dated Jan. 10, 2013.
J. Eltgen, A Short Review of Magnetography and its Related Materials Problems, Ind. Eng. Chem. Prod. Res. Dev., vol. 24, No. 2, 1985, pp. 196-201.
Extended European Search Report, from EP Application No. 12828967 (EP20120828967) ("Methods and Apparatus for 3D Fabrication"), Jun. 9, 2015.
International Search Report for International Applicaton No. PCT/US14/18806 ("Methods and Apparatus for Three-Dimensional Printed Composites"), dated Aug. 5, 2014.
Invitation to Pay Additional Fees for International Applicaton No. PCT/US14/18806 ("Methods and Apparatus for Three-Dimensional Printed Composites"), dated May 6, 2014.
Decision on Protest for International Applicaton No. PCT/US14/18806 ("Methods and Apparatus for Three-Dimensional Printed Composites"), dated Jun. 19, 2014.
Restriction Requirement in U.S. Appl. No. 13/582,939 ("Methods and Apparatus for 3D Fabrication"), dated Sep. 30, 2015.
Non-Final Rejection in U.S. Appl. No. 13/582,939 ("Methods and Apparatus for 3D Fabrication"), dated Mar. 29, 2016.
Final Rejection in U.S. Appl. No. 13/582,939 ("Methods and Apparatus for 3D Fabrication"), dated Oct. 7, 2016.
Non-Final Rejection in U.S. Appl. No. 14/835,690 ("Apparatus for Fabricating Three-Dimensional Printed Composites"), dated Nov. 15, 2016.

METHODS FOR PHOTOSCULPTURE

This application is a continuation of U.S. application Ser. No. 14/199,603, filed Mar. 6, 2014. This application hereby incorporates by reference in its entirety the disclosure of U.S. application Ser. No. 14/199,603. This application claims the benefit of U.S. Provisional Application No. 61/773,810, filed Mar. 6, 2013. This application (as did the provisional application of which it claims the benefit) hereby incorporates by reference in their entirety the disclosures of the following two applications (the "Prior Applications"): (1) Methods and Apparatus for 3D Fabrication, PCT patent application PCT/US12/52946, international filing date Aug. 29, 2012, and (2) Methods and Apparatus for 3D Printed Composite Materials, U.S. provisional patent application 61/769,724, filed Feb. 26, 2013.

TECHNICAL FIELD OF THE INVENTION

The present invention relates generally to methods and apparatus for 3D printing.

BACKGROUND OF THE INVENTION 3D printing is a well known process used to reproduce a three dimensional object from a target object or digital image. What is needed is a thorough technique to match the photographic likeness of a target object by generating a new object having the same color arrangement and topology of the target object. International Publication No. WO 2013/174526 A1 describes a system configured to assemble a plurality of individual media layers to form a colored 3D object, comprising a printer configured to color print at least a portion of a first surface of each of a plurality of media layers, and color print a corresponding portion of a second surface of the media layer, the second surface being opposite to the first surface, such that on operably printing the second surface a print-through region in the media layer is provided and a collator configured to assemble the plurality of the individual media layers to form the 3D object. It further describes a color 3D object media layer printing module, wherein the module is configured such that a second surface is presented to the printer such that the first and second images are coincident and on operably printing the second surface of the 3D object media layer a print-through region in the 3D object media layer is provided. It further describes an ink for color 3D printing, comprising a wetting agent that reduces the surface tension of the ink, causing it to be absorbed by the printing media. It further describes a medium for color 3D printing, comprising one of cellulose paper, polymer film, metal foils, ceramic powder impregnated paper sheets, metal powder impregnated sheets, polymer powder impregnated sheets, water soluble papers, or substrates made from waxes. And it further describes a layered object manufacturing (LOM) system for rapid prototyping. However, the prior art does not describe a process to fabricate a new 3D object from a target object in which a 3D object is sliced to form a bit map from which a texture map is obtained in order to color the edge of the bit map with color information from the texture map; and further, such that the slices are aligned and fused together and wherein uncoated material is removed by, for example, abrasive blasting, chemical removal or dissolution.

The present invention concerns the reproduction of a target object, accomplished by a step by step process in which a target object is scanned into a 3D file which is sliced and transformed into a bit map. A texture map is obtained from the scan, and the edge of the bit map is colored with color information from the texture map. Liquid is then selectively applied to a substrate, the printed slice is flooded with polymer powder, and excess powder is removed. This is done for each slice. The slices are aligned and fused together, and the uncoated material is removed.

The New Object is colored and painted. Coloring is accomplished by slicing the CAD model into slices. The slices are bit map files. These bit map files are colored by a program with the boundary to match the color, or gray scale to color the appropriate pixels. An area around the boundary should have a slight thickness so that inaccuracies in the process still produce a decorated part. A photograph of the target object is painted on the new object by producing a 3D scan to create a 3D model of the object including a texture map. The texture map is placed on the boundary of the object. Pixels are then extended to enlarge the boundaries to deal with inaccuracies of the process. Then, the 3D scan and texture map are combined.

In a final stage, after each layer is printed then the layer would be flooded with polymer powder, and the sheets fused together in register. Then by chemical or abrasive blasting or combination of the two or other methods the uncoated material would be removed. The boundary would now display the photographic image on the 3D printed object.

In an alternative embodiment of the invention, the new object could be based on a CT scan with colors throughout and those colors could be printed throughout the object. For example, a CT scanner can be used to take a CT scan of the Target Object. An ordinary camera may be used to take photographs of the object so that this information can be applied to the exterior of the CT 3D image. For example, multiple photos may be taken from different angles and then assembled in three dimensions and wrapped around a CT 3D image.

One or more processors or computers may be configured to perform the computations involved in the aforementioned processes.

SUMMARY OF THE INVENTION

The present invention involves fabricating a 3D object (the "New Object") layer by layer by 3D printing. The shape and relative dimensions of the various parts of the New Object match that of another 3D object (the "Target Object"). The exterior of the New Object appears to be a photographic likeness of the Target Object. The "photographic" likeness is created by variations in visual characteristics of materials in the layers comprising the New Object, and in particular by variations at or near the surface of the New Object. Thus, the photographic likeness is an integral part of these layers comprising the New Object. In order to accomplish the object of the invention, a CAD model is sliced into slices. These slices are bit maps files which are then colored by a program with the boundary to match the color or gray scale to color the appropriate pixels.

DETAILED DESCRIPTION OF INVENTION

In exemplary implementations of this invention, a 3D object (the "New Object") is fabricated layer by layer by 3D printing. The shape and relative dimensions of the various parts of the New Object match that of another 3D object (the "Target Object"). In addition, the exterior of the New Object appears to be a photographic likeness of the Target Object.

The "photographic" likeness is created by variations in visual characteristics of materials in the layers comprising the New Object, and in particular by variations at or near the surface of the New Object. Thus, the photographic likeness is an integral part of these layers comprising the New Object.

The visual characteristics of the materials comprising the layers of the New Object vary in different points of the 3D object. For example, the color or shade of the materials may vary within a layer or from layer to layer. When the New Object is fabricated, visual characteristics of materials in the layers (at and near the surface of the New Object) are varied to create the visual effect of a photograph likeness.

Alternately, the shape and relative dimensions of various features of the New Object may differ, at least in part, from that of the Target Object. Also, the photographic likeness may be produced in only a portion of the surface of the New Object.

The New Object can appear to be a "photosculpture" or "3D solid photograph" of the Target Object.

The New Object may be fabricated using methods and apparatus described in the following two applications (the "Prior Applications"): (1) Methods and Apparatus for 3D Fabrication, PCT patent application PCT/US12/52946, international filing date Aug. 29, 2012, and (2) Methods and Apparatus for 3D Printed Composite Materials, U.S. provisional patent application 61/769,724, filed Feb. 26, 2013.

For example, the layers of the New Object may comprise composite material(s), such as a composite material that includes polyester non-woven substrate. Also, for example, the New Object may be fabricated by selectively depositing thermoplastic powder.

Figure 1A:
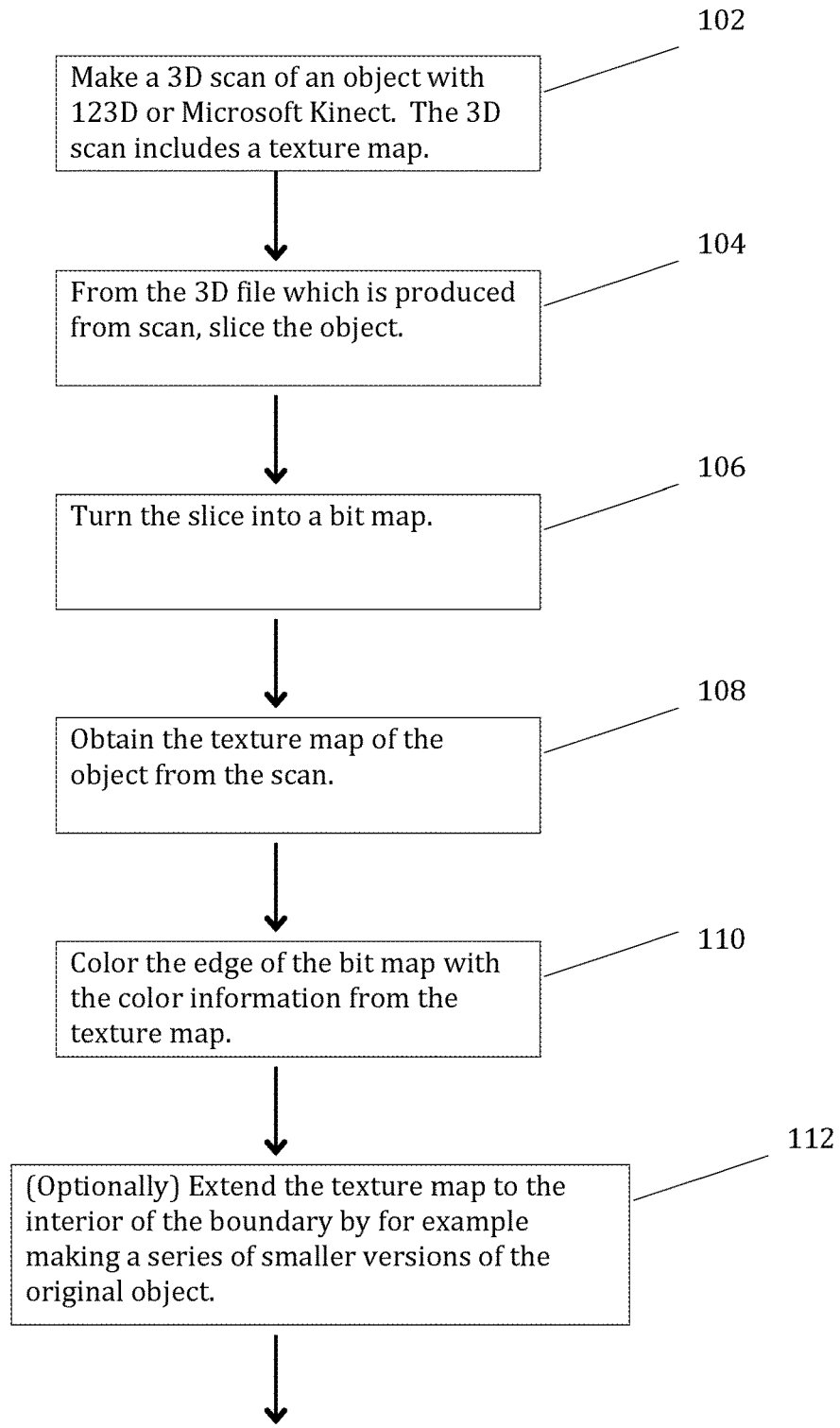
FIG. 1A is a flowchart illustrating a first part of the process of creating a photographic likeness.
Figure 1B:
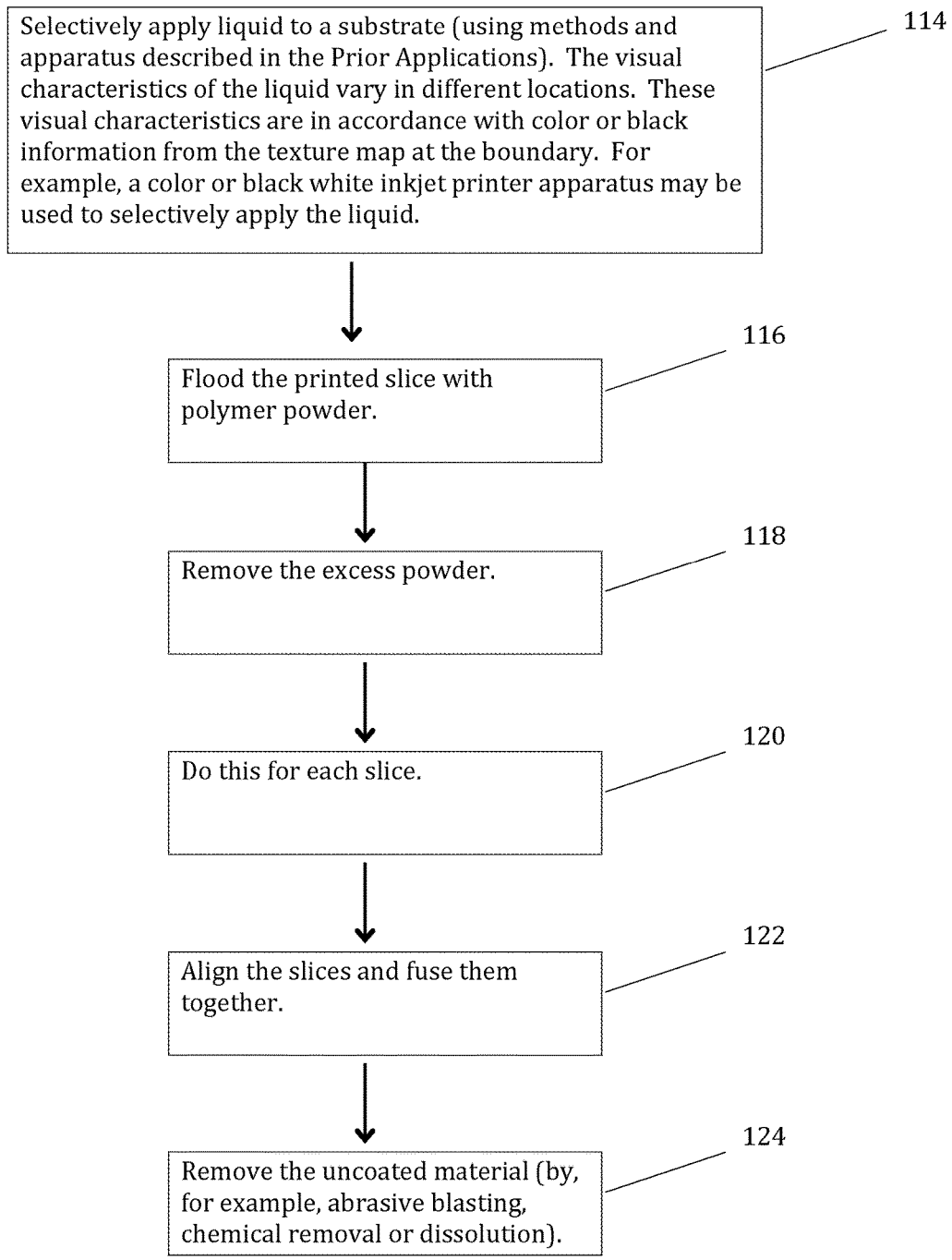
FIG. 1B is a flowchart illustrating the remaining part of the process of creating a photographic likeness.

FIG. 1 describes the steps that may be used to create the "photographic" likeness. These are:
1. Make a 3D scan of an object with 123D or Microsoft Kinect. The 3D scan includes a texture map (Step 102).
2. From the 3D file which is produced from scan, slice the object (Step 104).
3. Turn the slice into a bit map (Step 106).
4. Obtain the texture map of the object from the scan (Step 108).
5. Color the edge of the bit map with the color information from the texture map (Step 110).
6. (Optionally) Extend the texture map to the interior of the boundary by for example making a series of smaller versions of the original object (Step 112).
7. Selectively apply liquid to a substrate (using methods and apparatus described in the Prior Applications). The visual characteristics of the liquid vary in different locations. These visual characteristics are in accordance with color or black information from the texture map at the boundary. For example, a color or black white inkjet printer apparatus may be used to selectively apply the liquid (Step 114).
8. Flood the printed slice with polymer powder (Step 116).
9. Remove the excess powder (Step 118).
10. Do this for each slice (Step 120).
11. Align the slices and fuse them together (Step 122).
12. Remove the uncoated material (by, for example, abrasive blasting, chemical removal or dissolution) (Step 124).

In illustrative implementations, a New Object can be fabricated with visual characteristics that are derived from photographic information about a Target Object.

The New Object can be colored by using liquid from color inkjet cartridges (the liquid may be selectively applied, using the methods and apparatus described in the Prior Applications). The problem with using the manufacturers ink, in this case HP, is that the ink is water soluble and can bleed, bleach, and run in the support removal process. This problem can be solved in a number of ways including using piezoelectric heads and pigment inks or using pigment based.

For example, different colors of ink may be selectively applied in positions that are defined by a CAD model. These positions may be at (and just below) what will become the surface of the New Object after excess (e.g., uncoated) support material is removed from the New Object.

Figure 2:
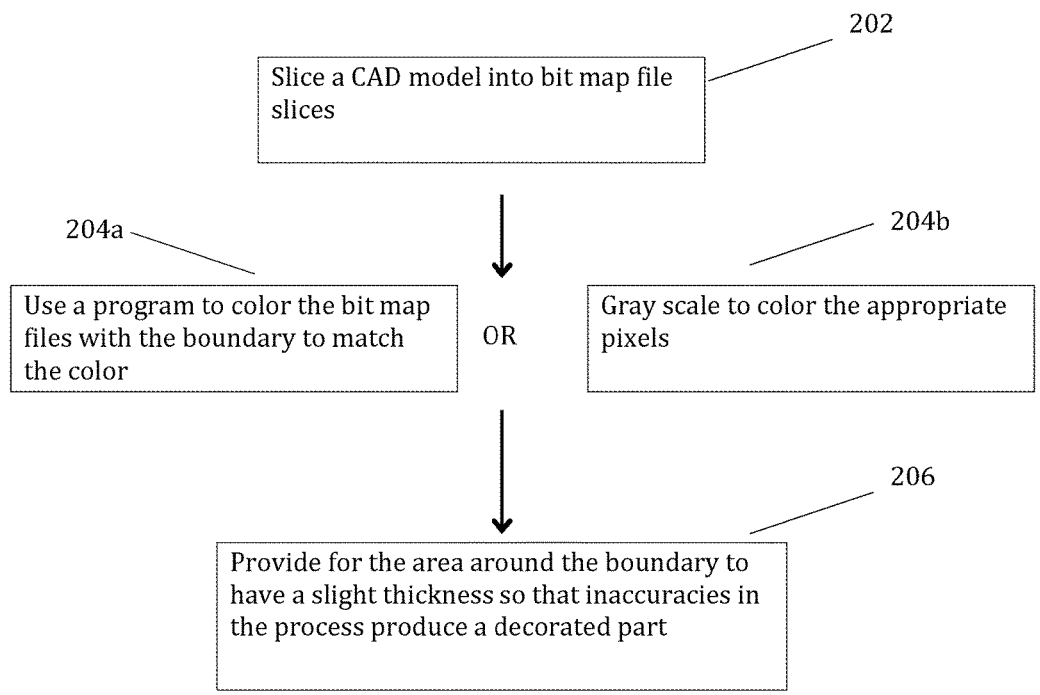
FIG. 2 is a flowchart illustrating the process of coloring bit map file slices.

FIG. 2 illustrates the process of coloring the bitmap in accordance with exemplary implementations of this invention. In step 202, a CAD model is sliced into slices (as described in the Prior Applications). These slices are bit maps files. In step 204*a*, the bit map file slices are colored by a program with the boundary to match the color, or, as in step 204*b*, gray scale to color the appropriate pixels. In step 206 (often advisable), the area around the boundary is provided to have a slight thickness so that any inaccuracies in the process still produce a decorated part.

Alternately, the colors may appear throughout the slice so that if the final object is cut open its interior composition can be seen. This would be useful in 3D models made from other 3D renderings including false color CT and MRI scans. This would allow for artificial dissections and other ways to display internal structure.

Figure 3:
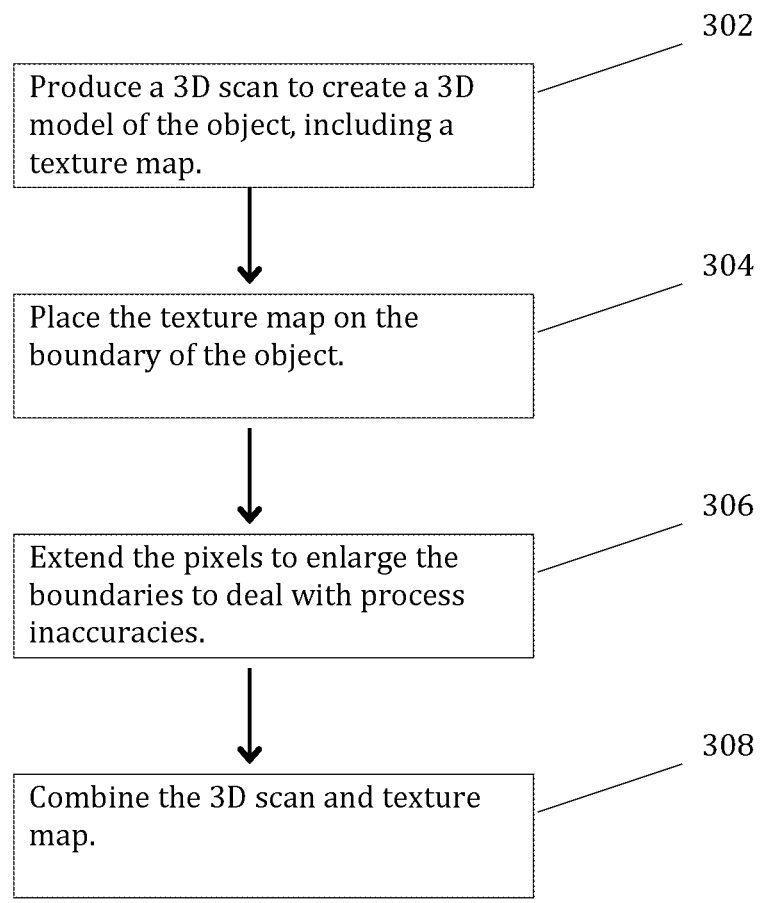
FIG. 3 is a flowchart illustrating the process of painting the photograph of a 3D object.

FIG. 3 illustrates the process of 'painting' the photograph of a 3D object on the 3D object. In step 302, one produces a 3D scan using systems like 123D which uses ordinary still photographs taken by an ordinary camera to create a 3D model of the object, including a texture map. Microsoft Kinect may be also be used which provides a 3D model and a color image which can also be used as a texture map. In step 304, the texture map is 'placed' on the boundary of the object. Next, step 306 is to again extend the pixels to enlarge the boundaries to deal with inaccuracies of the process.

Once the object is scanned, step 308 is performed in which the 3D scan and texture map can be combined. For example the Additive Manufacturing File Format can be used to construct slices which are color or black and white bit map files for each slice. Each file can include the texture map information and information which defines the slice. At least the boundary will have texture map information. If one wants to have internal color information, that will also be in the bit map. As noted above, generally the boundary will be made a little thicker to deal with the inaccuracies of the process. The bit map will be printed (using the methods and apparatus described in the Prior Applications) and the 3D New Object will be produced. The finished New Object will have a photographic likeness of the Target Object on the surface of the New Object.

In exemplary embodiments, this photographic likeness is an integral part of the layers of the New Object, and is not merely an exterior layer sprayed, painted or otherwise applied after the layers of the New Object have been fused. Other 3D file formats can be used.

Figure 4:
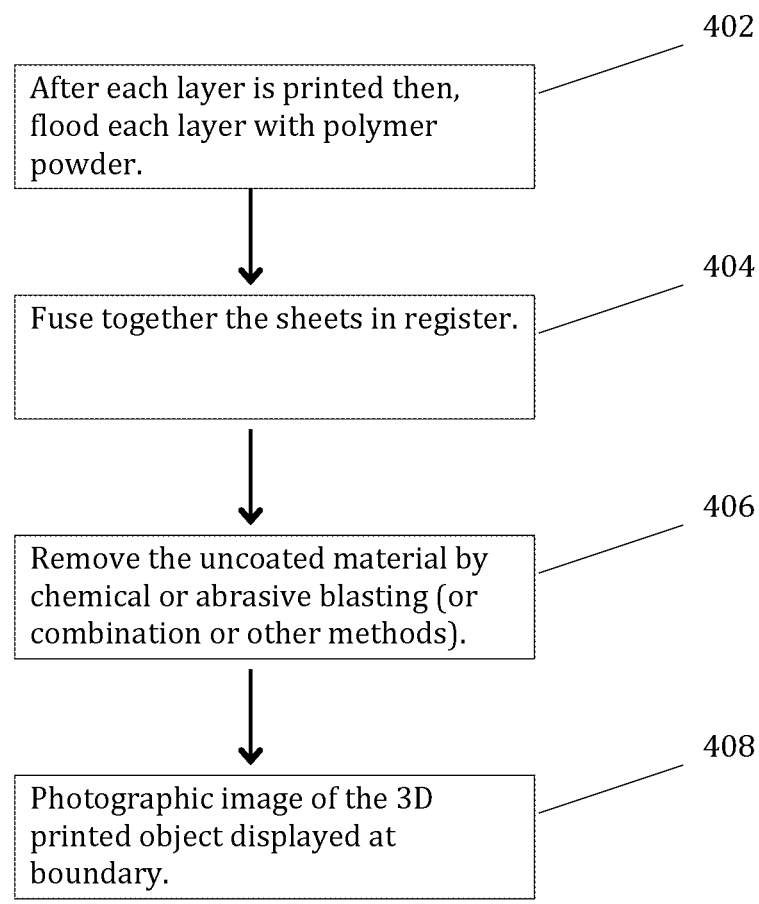
FIG. 4 is a flowchart illustrating the process of final processing.

One or more processors or computers may be configured to perform the computations involved in the above described steps, including those in FIGS. 1-4, as well as those shown in FIG. 1 of PCT patent application PCT/US12/52946, Methods and Apparatus for 3D Fabrication. FIG. 4 is described below.

In one aspect, this invention comprises a 3D article of manufacture produced by the methods and apparatus describe above. For example, this invention may comprise a 3D article of manufacture (a "New Object") comprising at least one composite material, which composite material comprises substrate layers coated by a thermoplastic or by a thermoset plastic. The layers of the New Object may include pigments or other visually colored or visually shaded material positioned at or adjacent to the surface of the 3D object. These pigments (or other visually colored or visually shaded material) may have, on at least a portion of its surface, a photographic likeness of another 3D physical object.

If one is creating a black and white photographic likeness, one can use two inks: a first dark ink for the black dots to decorate the object (and also used so that the powder sticks to the substrate) and a second clear ink for white or light areas (and also to output fluid so that the powder will stick to the substrate). The second ink can be used for any parts of the New Object which are white but nonetheless need to have material. This assumes that the substrate used in the process is white. If one wants to do color, one can use at least multiple cartridges for clear, process colors and possibly black or additional colors or no color for better color rendition.

One issue with this process relates to shadows and highlights or other artifacts in the original 3D image. Thus it is best if the object or objects are light with flat or diffuse lighting. In the instance where this is not possible, the scene can be relit to eliminate the effect of highlights and shadows among other features.

In exemplary implementations, this invention has many practical applications. Among other things, a 3D object can be produced to look like the original, for example sample of products, wedding or baby photographs, still lifes or natural landscapes. For example this would be a simple way of making a scale reproduction of the space shuttle or other object which by today's methods is costly, cumbersome and always lacking in correctness.

Additionally synthetic decorated objects can also be produced using fundamentally the same methods.

Further abrasive blasting can be used in addition to chemical methods to remove excess support material as described in the provisional patent application that is one of the Prior Applications.

The apparatus that produces these parts would comprise for example an x-y positioner which includes inkjet print cartridges. For example, for producing black and white photographic likenesses, at least two cartridges could be used: one for selectively depositing clear liquid (to determine where powder will adhere to the substrate in a white part of the object) and the other for selectively depositing black ink Or, for example, for producing color photographic likenesses, four cartridges could be used, for example the three process colors and clear (again, the clear liquid can be used to determine where powder adheres to the substrate in a white or light part of the object). These would print in accordance with a bit map which is a slice of the object being printed. The boundary of the object would have the color or black printed on it, or clear for white. This boundary could be larger than one pixel.

FIG. 4 illustrates final processing. In step 402, after each layer is printed then the layer would be flooded with polymer powder as described in documents incorporated in this application by reference. In step 404, the sheets would be fused together in register. In step 406, the uncoated material would be removed by chemical or abrasive blasting or combination of the two or other methods. In step 408, the boundary would now display the photographic image on the 3D printed object.

Figure 5:
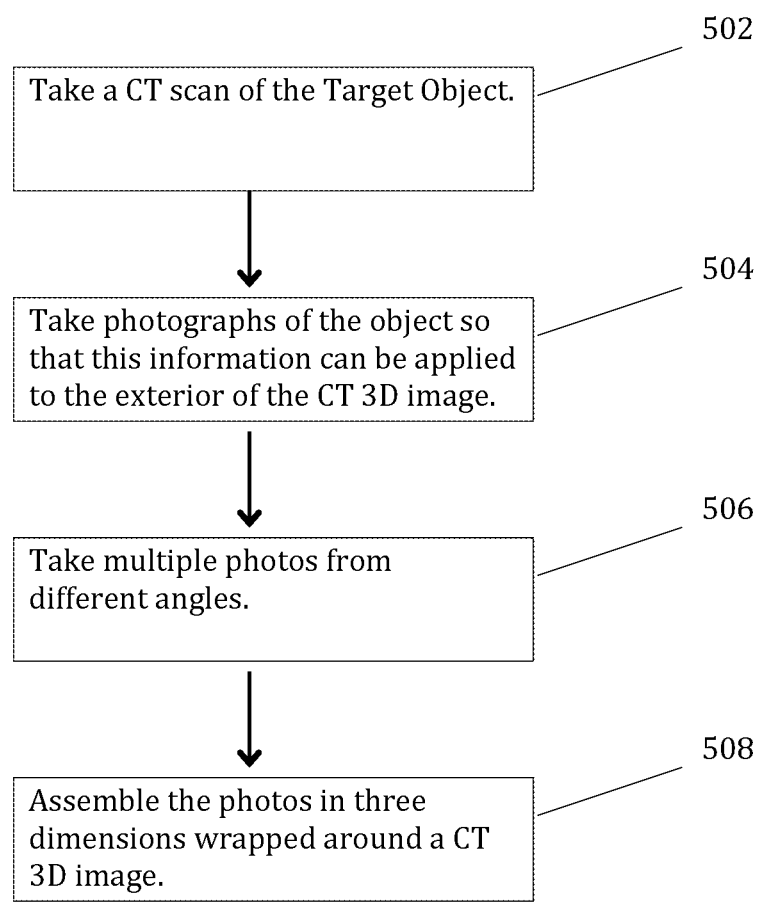
FIG. 5 is a flowchart illustrating an alternative 3D fabrication process.

FIG. 5 illustrates an alternate 3D fabrication process. In this embodiment, the object could be based on a CT scan with colors throughout and those colors could be printed throughout the object. In step 502, a CT scanner can be used to take a CT scan of the Target Object. In step 504, an ordinary camera may be used to take photographs of the object so that this information can be applied to the exterior of the CT 3D image. In step 506, multiple photos may be taken from different angles. In step 508, these photos are then assembled in three dimensions and wrapped around a CT 3D image.

The object could for example comprise of layers of polyester woven or non-woven material which has a photographic image on the boundary or other image throughout the object which is fused together with a polymer or other material. This may include residue of 2-Pyrrolidone or other material which was used to slow the evaporation of inks or fluids. This would be for example an object that has a photograph texture map printed on it. Again the color or black and white could be printed on the object either at the surface or throughout the object.

While the invention has been described with particular reference to specific embodiments, it will be apparent to those skilled in the art that the same principles may be used in similar arrangements. The invention is not limited to the precise structures described. Various changes and modifications may be made without departing from the spirit and scope of the invention as defined by the claims below. For example, steps of a process can be in any order, unless the context clearly indicates otherwise.

SELECTED MATTER OF DISCLOSURES INCORPORATED BY REFERENCE

The following are passages from the disclosures incorporated herein by reference. These passages describe methods and apparatus for how the New Object may be fabricated. The first, Methods and Apparatus for 3D fabrication, describes how a 3D object is formed layer by layer, where thermoplastic powder (or thermosettable plastic powder) is selectively deposited on one layer of substrate, then on a second layer of substrate, then on a third, and so no. The second, Methods and Apparatus for 3D Printed Composite Materials, describes methods and apparatus for fabricating a 3D object. The object is made, at least in part, of a layered composite material, the composite material may comprise carbon fiber substrate layers joined by a hardened thermoplastic or thermoset.

(1) Methods and Apparatus for 3D Fabrication, PCT patent application PCT/US12/52946, International Filing Date Aug. 29, 2012

Selective Deposition of Powder:

According to principles of this invention, the powder may be selectively deposited on substrate layers in many different ways.

Example 1 (Of Selective Deposit of Powder)

First, powder may be selectively deposited on a substrate layer by making the powder adhere to a liquid, as follows: A liquid is selectively deposited on a substrate layer, so that some parts of the substrate layer are covered with liquid, and some are not. Then the side of the substrate layer on which the fluid was deposited is flooded with powder (e.g., the powder is poured on this side of the substrate layer). The powder adheres to the liquid. The excess powder (i.e., the powder that is not adhering to the liquid) is removed. For example, this excess powder may be removed by vacuuming. Or, for example, the substrate may simply be flipped over, so that the excess powder falls off. Or the substrate may be turned upside down and flicked with a finger. The substrate may be vibrated while the excess powder is removed, in order to facilitate the removal. In some cases, the liquid that is selectively deposited is water (or an aqueous solution that includes a material that slows the evaporation of water). For example, the material may be 2-Pyrrolidone. In other cases, it is a different liquid, such as an alcohol. For example, if the substrate is water sensitive (e.g. if the substrate is polyvinyl alcohol, PVOH), then water may distort or dissolve the substrate. In that case, an alcohol may be used as the liquid that is selectively deposited. In some cases, to prevent the liquid that is selectively deposited from spreading or being excessively absorbed into the substrate, it is helpful to apply a surface energy modifier to the substrate, before selectively depositing the liquid. For example, Scotchguard® Fabric & Upholstery Protector (available from 3M, St. Paul, Minn.) may be sprayed or deposited on the substrate layer for this purpose. Alternately, other repellents or surface energy modifiers can be used.

Rastering:

FIG. 5 shows apparatus used to selectively deposit liquid (to which powder adheres), in an illustrative implementation of this invention. Registration guide posts 501 are inserted through a substrate layer 503 in order to properly align the substrate layer 503. A solenoid valve 505 is used to selectively dispense liquid from a liquid reservoir 507 though a nozzle 509 unto the substrate layer 503. The nozzle 509 is rastered in a 2D plane 510 that is parallel to, and above, the substrate layer 503, so that the liquid is selectively deposited at desired x, y coordinates of the substrate layer 503, and not deposited in other areas of the substrate layer 503. To achieve this rastering, a stepper motor 511 actuates two belts (not shown) that causes a support member (not shown) to move along two rails (not shown) in a direction parallel to the x axis. A second stepper motor (not shown) and third belt (not shown) are mounted on the support member, and are used to move a nozzle support (not shown) in a direction parallel to the y axis. The nozzle 509 is attached to the nozzle support. Together, the two stepper motors can move the nozzle 509 to any desired x, y coordinate above the substrate layer. A microprocessor 513 controls the stepper motors and the solenoid valve, thereby controlling when and where liquid is dispensed on the substrate layer 503.

Alternately, rather than rastering in a line-by-line pattern, the stepper motors may cause the nozzle 205 to move in other 2D patterns in the 2D plane to cause the liquid to be deposited at certain x, y coordinates.

FIG. 5 does not show apparatus for heating and pressing multiple layers of substrate, or for removing excess substrate. In some implementations, the substrate layer is moved to a different position before those steps occur.

Processors:

In exemplary implementations, computer processors are used to control the 3D printing process.

Figure 6:
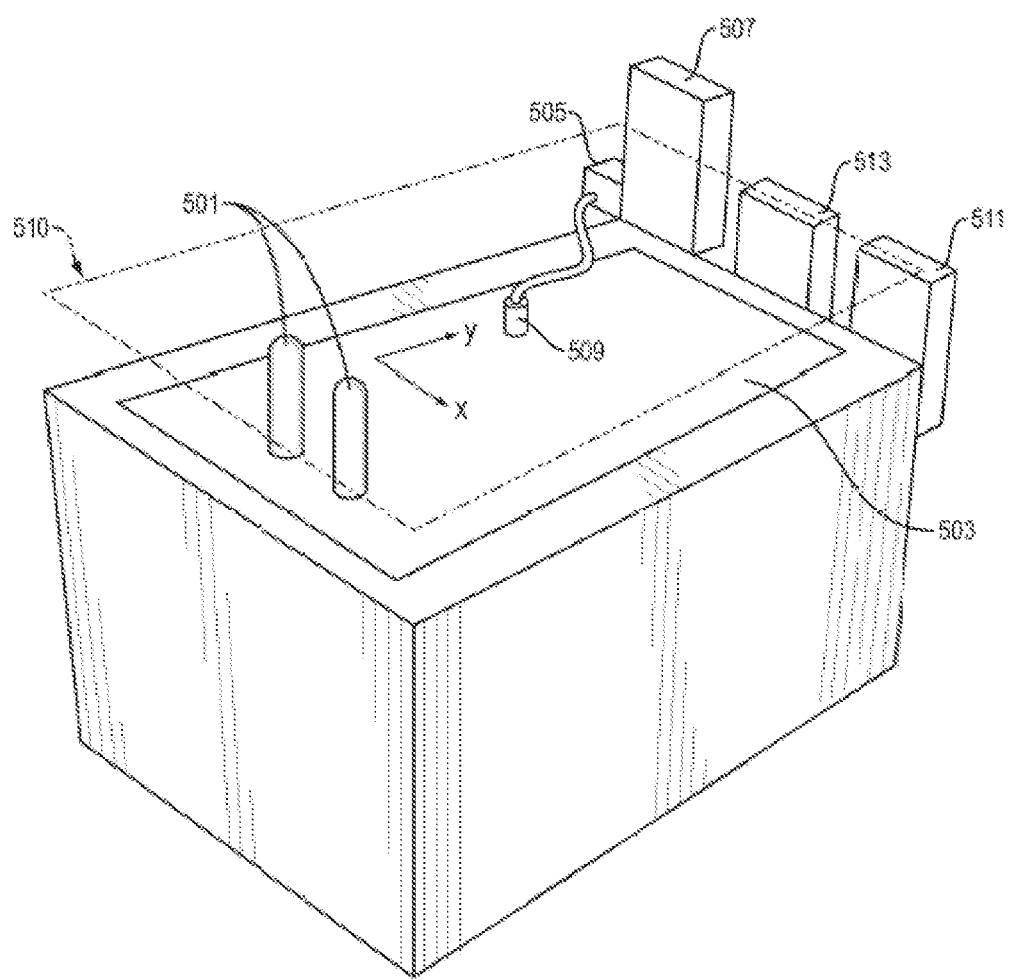
FIG. 6 shows an apparatus used to selectively deposit liquid (to which powder adheres), in an illustrative implementation of this invention.

FIG. 6 is a block diagram that shows a plurality of processors, in an illustrative implementation of this invention. A CAD model of a desired 3D object in STL file format is created using a remote processor 601. This processor 601 employs software (such as Netfabb® Studio software) to create a machine-specific build file. The machine-specific build file is exported to a second processor 603. Depending on the particular implementation, this second processor controls the operation, including movements, of: (1) an inkjet head or other device that selectively deposits liquid, (2) actuators that spread out the powder on the substrate and then remove the excess powder, (3) a thermal print head, (4) a hot stamp press, or (5) actuators that feed or flip over substrate layers.

Alternately, this invention may be implemented with other arrangements of processors. For example, more than one remote processor and more than one onboard processor may be employed, and any of the above tasks may be handled by one or more of these different processors.

Figure 7:
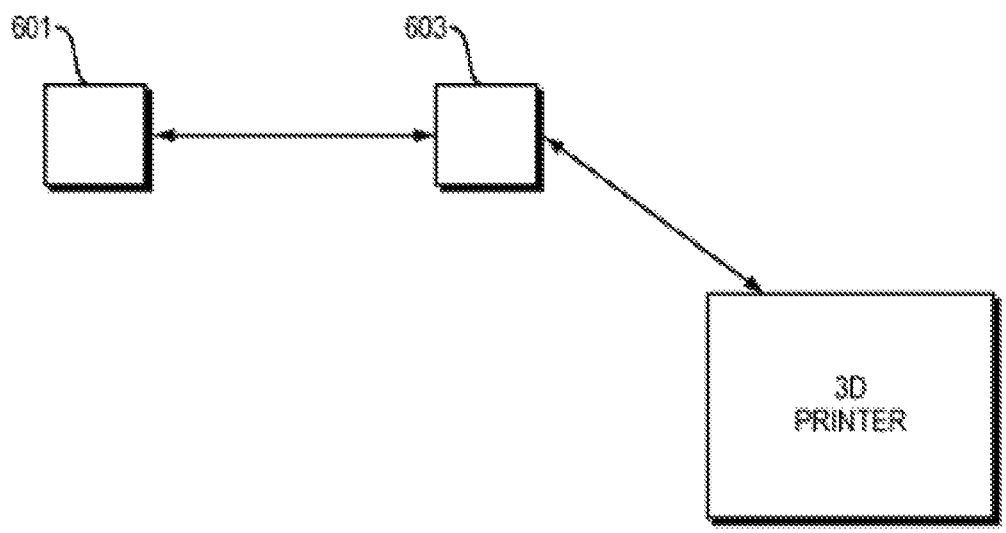
FIG. 7 is a high-level block diagram of processors, in an illustrative implementation of this invention.
Figure 8:
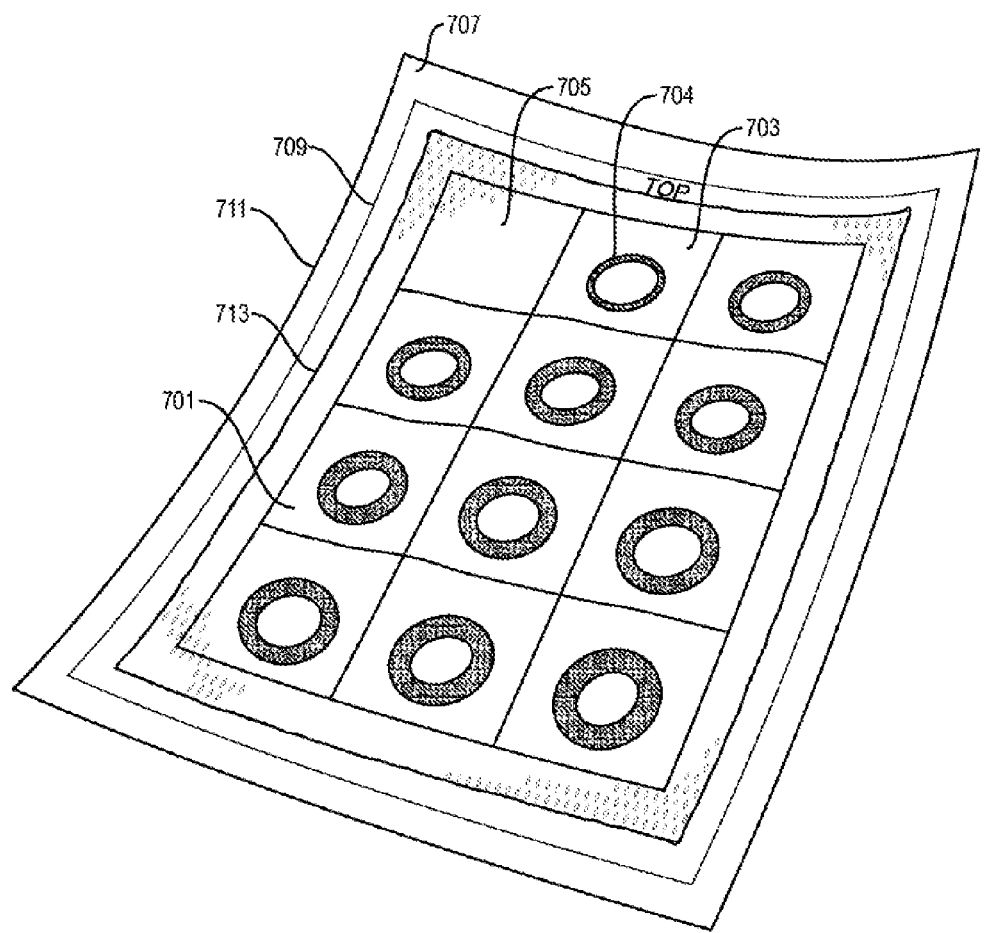
FIG. 8 shows a pattern that has been inkjet-printed on a substrate layer. The pattern comprises a 4×3 matrix. In each tile of the matrix, respectively, a different cross-sectional "slice" of a ring torus has been printed by the inkjet printer.
Figure 9:
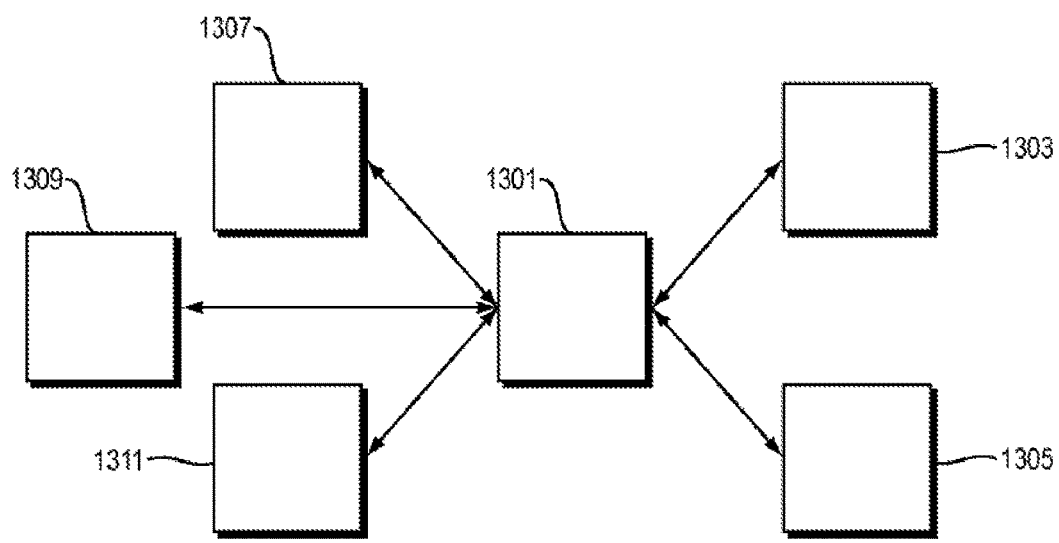
FIG. 9 is a block diagram that shows a processor that controls multiple components of an apparatus for fabricating a 3D object.
Figure 10:
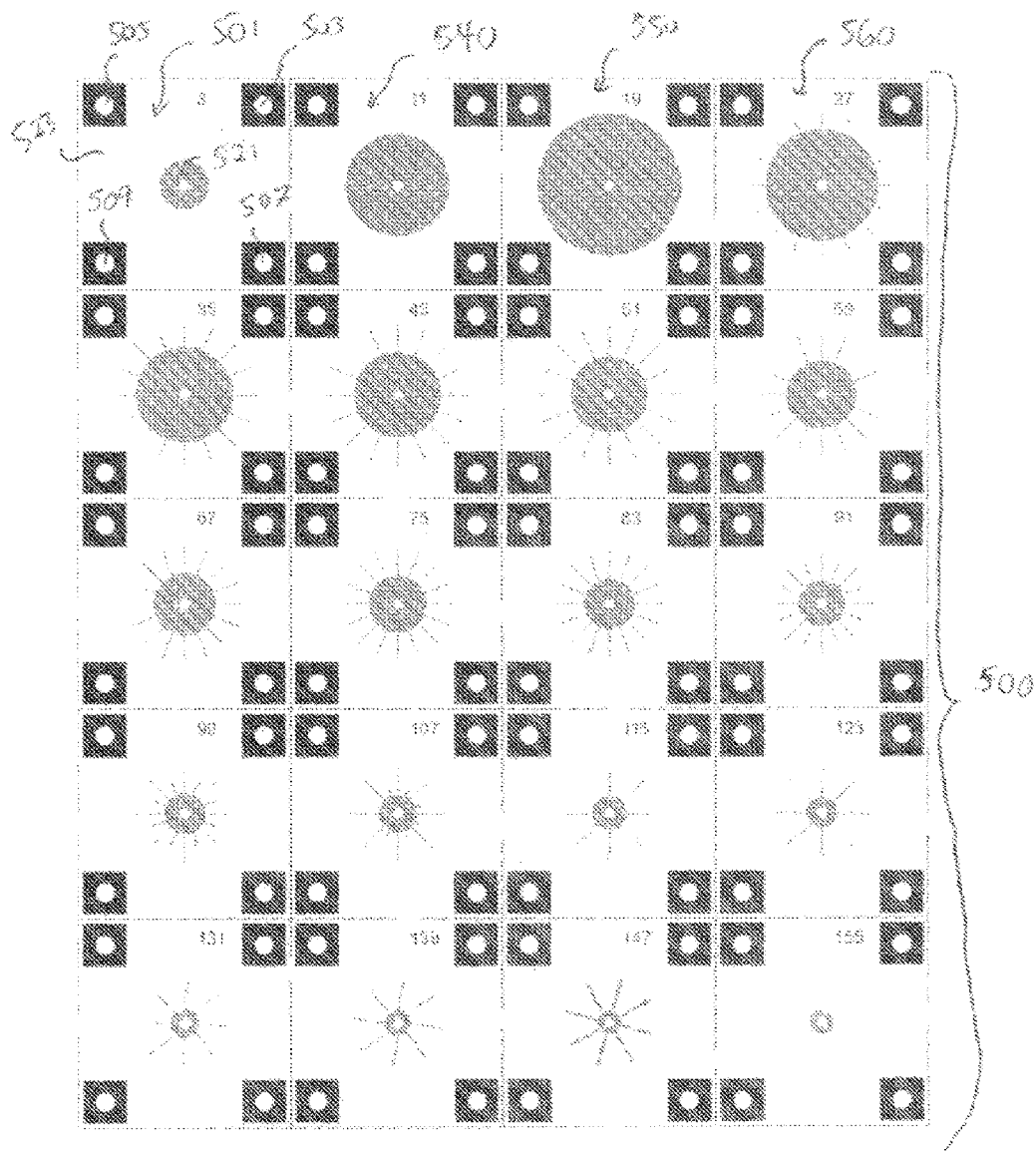
FIG. 10 shows a pattern that may be used for printing multiple "slices" on a single sheet.

FIG. 7 shows a pattern that has been inkjet-printed on a substrate layer 701. The pattern comprises a grid that defines a 4×3 matrix of tiles. In each tile, respectively (e.g., 703), a different cross-sectional "slice" (e.g., 704) of a ring torus has been printed by the inkjet printer. (The upper left tile 705 in FIG. 7 is a null slice of the ring torus, i.e., it does not include a part of the ring torus).

FIG. 7 shows how the substrate layer is aligned with a sheet of paper 707. On the sheet of paper 707, rectangles have been pre-printed. The substrate layer is taped on the paper so that the outer edges of the substrate layer align with one of these pre-printed rectangles on the sheet of paper. More specifically, in FIG. 7, three rectangles, nestled inside each other, have been pre-printed on the paper. The outer rectangle 711 and central rectangle 709 of these three rectangles are visible in FIG. 7. The innermost of these three pre-printed rectangles on the sheet of paper is not visible in FIG. 7. However, innermost rectangle is aligned with, and lies directly beneath, the outer edge 713 of the rectangular grid (visible in FIG. 7) that was printed on the substrate layer by the inkjet printer.

After the inkjet printer prints the pattern on the substrate layer, the substrate layer is flooded with thermoplastic powder (e.g. Schaetti® Fix 400 powder). The excess powder is then removed, by turning the paper upside down and tapping the paper with a finger. Other removal methods may be used, such as vacuuming or blowing the excess powder away.

The substrate layer is then aligned on a laser cutter. The laser cutter then cuts lines that separate the substrate layer into the tiles and cuts two registration holes in each of the tiles.

In this example, each substrate layer is divided into 12 tiles, with a different "slice" of a ring torus printed on each tile, respectively. These tiles are placed in a device for applying pressure (a "compressive device"), one tile on top of another. The compressive device includes one or more elastic components (e.g., springs) to maintain pressure on the substrate layers even if they compress. The tiles are aligned by inserting two guide holes in each tile, respectively, through two guide posts in the press.

In exemplary implementations of this invention, a variety of means may be used to transform powder into a substance that flows and then subsequently hardens. For example, the means may comprise a heating element. The heating element may comprise any artificial heat source that heats by one or more of conduction, convection or radiation. For example, the heating element may comprise: (1) a resistor or any other resistive heating element; (2) any other device that converts electricity into heat by ohmic heating; (3) a hot stamp press or any other apparatus for applying heat and pressure; (4) an oven; or (5) an artificial source of electromagnetic radiation, including a heat lamp, an artificial infrared light source, a laser; or an artificial source of microwave radiation. Also, for example, the means may comprise an artificial pressure source, including a press, clamp, iron, roller, pump, piston, or elastic element (e.g. spring) for applying pressure. The pressure may be used, for example, to compress layers together or to squeeze the flowing substance into interstices in the substrate layers. Or, for example, the pressure may be used to crush, rupture or burst grains of powder that encapsulate liquid. The liquid may then flow, and may harden or cause something else to harden. The heating element or pressure source may be configured to transform powder into a substance that flows and then subsequently hardens. Also, for example, the means may comprise a reagent, reactant, catalyst, solvent or solute used in a chemical reaction. The reaction may soften or harden all or a portion of the powder. An applicator may be configured to apply, deposit or deliver the reagent, reactant, catalyst, solvent or solute to the powder. Also, for example, the means may comprise an artificial source of electromagnetic radiation. The radiation may, for example, be used for hardening the powder, including by curing. The radiation source may be configured to transform powder into a substance that flows and then subsequently hardens FIG. 13 is a high-level block diagram of some hardware that may be used in this invention. One or more processors 1301 control an applicator 1303, a heating element 1305, an actuator 1307, an artificial pressure source 1309, and a stirrer in a container of liquid 1311. The applicator 1303 deposits powder in positive regions, but not in negative regions, of substrate layers. The heating element 1305 transforms the powder into matter that flows and then hardens. The resulting hardened material is disposed in a spatial pattern that infiltrates the substrate layers. The artificial pressure source 1309 may comprise a press, clamp, spring, elastic element, or other device for compressing the substrate layers. The stirrer may be used to stir a liquid that is used for removing excess substrate.

This invention may be implemented as apparatus for fabricating a 3D object, which object comprises a plurality of layers and a hardened substance, the apparatus comprising, in combination: (a) an applicator, the applicator being configured for selectively depositing powder in at least some positive regions, but not in at least some negative regions, of at least some of the layers; and (b) a heating element, the heating element being configured for transforming the powder into matter that flows and then hardens into the hardened substance, which hardened substance binds the layers together and is disposed in a spatial pattern that infiltrates the layers; wherein the substrate layers have at least one material property that is different than any material property of the hardened substance. Furthermore:

(1) the apparatus may further comprise an artificial pressure source, the pressure source being configured for applying pressure to one or more of the layers; (2) the pressure may be applied during softening of the powder; (3) the apparatus may further comprise one or more actuators, the one or more actuators being configured for translating one or more of the powder and the layers; (4) the apparatus may further comprise an additional actuator, the additional actuator being configured for translating the applicator into different positions while the applicator selectively deposits the powder; (5) the apparatus may further comprise a processor, the processor being configured for outputting control signals to control the applicator and heating element; (6) the processor may be adapted to output control signals to control the selectively depositing of powder for each of the at least some substrate layers, respectively, in accordance with digital data that specifies different slices, respectively, of the 3D object; and (7) the apparatus may further comprise a container, the container being configured for containing a liquid, which liquid includes a solvent or degrading material that is used for removing material from the at least some negative regions.

This invention may be implemented as apparatus comprising, in combination: (a) at least one applicator for depositing thermoplastic or thermosettable powder on multiple layers of substrate, in a pattern, for each substrate layer, respectively, defined by a digital description of a slice or section of a 3D object, (b) at least one heat source for applying heat to the substrate layers, (c) at least one pressure source for applying pressure to the substrate layers, and (d) one or more computer processors for (I) accepting and processing digital data describing a section or slice of a 3d object, and (II) outputting control signals for controlling the operation of the applicators. The apparatus may further comprise one or more of the following: (1) a container for containing a liquid, which liquid includes a solvent or degrading material that is used for removing excess substrate, the excess substrate being that portion of the substrate that is not coated by thermoplastic or thermoset material after it melts or softens and then cools, (2) a heat source for heating the liquid solvent or degrading material, and (3) one or more actuators for translating one or more of the powder, substrate sheets and the finished or partially finished 3D object. Also, depending on the particular embodiment of this article of manufacture, the one or more computer processors may do one or more of the following: (1) accept and process data from one or more sensors, such as heat or pressure sensors, or sensors for determining whether and to what extent adjacent substrate layers are aligned, (2) control the at least one heat source, (3) control the at least one pressure source, (4) control the one or more actuators, and (5) accept data indicative of input from a human user.

(2) Methods and Apparatus for 3D Printed Composite Materials, U.S. provisional patent application 61/769,724, Filed Feb. 26, 2013.

In exemplary implementations of this invention, multiple "slices" of a desired 3D object may be printed on a single sheet. Slices from multiple sheets may be used to fabricate the desired 3D object.

FIG. 5 shows a pattern that may be used for printing multiple "slices" on a single sheet 500. In this example, the pattern comprises a 5×4 array of square elements. Each square element is a pattern for a single "slice" of a desired 3D object. In each square element (e.g., 501), there is at least one "positive" area (e.g. 521), corresponding to the region of the slice that will be part of the desired 3D object, and at least one "negative" area (e.g., 523), corresponding to a region of the slice that will not be part of the desired 3D object. In the four corners of each square element (e.g., 501), the pattern includes four registration holes (e.g., 503, 505, 507, 509), one hole per corner. Because the rim (which is square in FIG. 5) of each hole is stronger than the hole itself, the hole can simply be poked out by a hard instrument. Alternately, registration holes may be cut out (e.g., by a laser cutter). In either case, once the holes are formed, registration pins may be inserted through the registration holes in order to align the "slices".

In the example shown in FIG. 5, a single sheet 500 has a pattern for a 5×4 array of slices (i.e., 20 slices per sheet). Slices from eight sheets may be used to fabricate a 3D object comprising 160 slices.

Signatures (in the printing sense) may be used when grouping the slices. In the example shown in FIG. 5, each signature would comprise 8 slices. A total of 20 signatures would be used to fabricate a 3D object comprising 160 slices. For example, the slice in square element 501 is the third slice out of 160 slices, and would be included in a first signature that comprises the first eight slices out of the 160 slices. Also, for example, the slice in square element 540 is the eleventh slice out of 160 slices, and would be included in a second signature that comprises slices nine to sixteen out of the 160 slices.

In an illustrative implementation of this invention, a composite 3D object is produced as follows:

1. Cut nonwoven carbon fiber substrate layer on laser cutter. Cut registration holes into the layer. The substrate can be cut in advance of the rest of the process.
2. Put nonwoven substrate layer on registration post of printer.
3. "Print" a slice. (In this step, liquid is selectively applied to the carbon fiber substrate layer, e.g., by inkjet printing).
4. Remove carbon fiber substrate layer from printer.
5. Flood carbon fiber substrate layer with thermoplastic powder. The powder adheres or "sticks" to the substrate only where the liquid was applied.
6. Remove excess powder by turning carbon fiber substrate layer over and shaking until excess powder it falls off.
7. Remove any remaining excess powder with a stream of compressed air.
8. Place carbon fiber substrate on a heated surface (e.g., a hot griddle or other heating element) and melt the powder that adhered to the printing liquid. Preferably, the heated surface has been previously treated with polytetrafluoroethylene, so that the carbon fiber substrate does not stick to the heated surface. Alternatively, a layer of another material may be interposed between the heated surface and the carbon fiber substrate, to prevent sticking
9. Place the printed carbon fiber substrate on a fixture using registration holes to align.
10. Return to step 2 until all layers have been printed and placed on the fixture, creating a stack of printed carbon fiber/polymer powder layers
11. Place the stack into a compression device. Then use the compression device to apply pressure to the stack. The compression device may include, for example (1) springs for applying compression; and (2) bolts or standoffs for limiting the amount that the substrate layers are compressed.
12. Preheat oven.
13. Put compression device (with stack of carbon fiber layers in it) in oven.
14. Heat the compression device (with the carbon fiber layers in it) for appropriate time.
15. Remove compression device from oven.
16. Let compression device cool to room temperature.
17. Open up the compression device (e.g., in some cases, by unscrewing nuts).
18. Remove fused 3D object from the compression device.
19. Remove the excess region of each substrate layer by abrasive blasting. The excess region is the portion of the substrate layer that was not covered or permeated by the melted thermoplastic material.

General Observations

In exemplary implementations of this invention, a composite 3D object is produced, layer by layer, using carbon fiber substrate layers. A CAD model of the desired 3D object is produced first. Then a software program (e.g., a Netfabb® program) slices the CAD model into slices of correct thickness, and produces bitmaps for each layer.

A non-woven carbon fiber substrate may be used. (Alternately, woven or chopped carbon fiber substrate may be used).

An applicator may selectively deposit liquid on each carbon fiber substrate layer, respectively. In some implementations of this invention, the applicator may comprise, for example, an inkjet head. The inkjet head may be housed in an inkjet printer. Alternately, the inkjet head may be affixed to another device that is configured to position the inkjet head for printing, e.g., by rastering or moving the inkjet head to a particular x,y position over the carbon fiber layer. The inkjet head may be a thermal head or, alternately, any other type of inkjet head, including a piezoelectric head.

The applicator may move over the carbon fiber substrate layer. As it does so, the applicator may "print" a swath of the bitmap onto the carbon fiber by selectively depositing liquid onto the carbon fiber. A wide variety of fluids may be deposited by the applicator. For example, conventional inkjet ink may be used. Alternatively, the fluid in the applicator may be a mixture of distilled water and 2-Pyrrolidone. For example, the mixture may comprise 10% to 50% 2-Pyrrolidone, and the rest distilled water. The mixture (of distilled water and 2-Pyrrolidone) may be used for the purpose of reducing the evaporation rate of the fluid from the carbon fiber. Other fluids (e.g., glycols) can be used for this purpose.

In a prototype of this invention, the applicator comprises an HP45A inkjet cartridge (available from Hewlett-Packard Company).

The carbon fiber layer may then be removed from the apparatus where the liquid was dispensed. The carbon fiber layer may then promptly (so that the liquid does not evaporate) be flooded with nylon powder. For example, the nylon powder may have an average grain size in the range of 50 to 100 microns. Alternatively, other polymer powders such as polyethylene or PEEK (polyether ether ketone) can be used. Advantageously, PEEK is a high performance resin.

Powder adheres where the liquid was deposited by the inkjet head. The excess powder (which did not adhere to the deposited liquid) can be removed by shaking the substrate layer upside down and then blowing it with an air hose. This removes the excess powder that may have been trapped in the crevices of the substrate layer. The carbon fiber layer may be placed on a heated surface (e.g., a griddle) or placed adjacent to any heating element. The heat melts and thus better attaches the remaining polymer powder so that the remaining powder tends not to be displaced in further handling.

Each of the sheets of carbon fiber may then be placed on four registration posts in a compressive device. The process above (print on substrate layer, then put substrate layer on the registration posts) may be repeated until all of the carbon fiber layers have been "printed" with thermoplastic powder and placed on the registration posts of the compressive device. The compressive device may include one or more plates, springs, nuts and bolts to apply pressure to the stack of carbon fiber layers. The pressure may compress the stack. The compressive device may be configured to apply a constant amount of pressure even as the dimensions of the stack change under heat and pressure. A standoff, separator or other mechanical component (e.g., a nut) can be used to maintain a minimum distance past which the stack of carbon fiber layers cannot be compressed.

The compressive device is placed in an oven. The time spent in the oven and the temperature of the oven may be chosen depending on the size of the desired object. The heating causes the layers to fuse together. As the powder melts, it covers the fibers. The compressive device is later cooled and the molten material hardens. After that, bolts holding the plates are loosened and the stack of layers is removed from the compressive device.

Abrasion may be used to remove excess regions of carbon fiber layers (where the melted powder did not coat or infiltrate). Carbon fiber is quite fragile in bending and can be abraded. However, the portion of the substrate layer which has been impregnated with the thermoplastic or thermoset material is quite hard and stiff and resistant to abrasion. The largest portion of the excess region may be removed by scraping with a dental tool. Also, for many geometries, the final removal can be done with a wire bush. In addition, abrasive blasting can be used to remove the uncoated carbon fiber. Also, abrasive blasting can clear internal channels in the 3D object.

After removing the excess region, the result is a stiff 3D carbon fiber composite of nearly arbitrary geometry. This fiber composite is fabricated without the use of tooling and in accordance with a CAD model.

What is claimed is:

1. An apparatus for fabricating a colored three-dimensional object, comprising:
   A three-dimensional computer-aided design (CAD) model of the object that includes all external surfaces of the object including surface coloring;
   a processor constructed to logically slice the three-dimensional CAD model into a plurality of two-dimensional cross-sectional slices, each slice having an interior and an outer boundary enclosing the interior, wherein each outer boundary maintains the surface coloring of the object at that boundary; and
   a color printer constructed to print a replica of each slice on a two dimensional substrate, the printer coloring the outer boundary of each replica according to the surface coloring of the object at that boundary, the printer also printing the interior of each replica using either a color from the boundary, or a predetermined color to form a plurality of colored replicas;
   an applicator constructed to flood the plurality of colored replicas with a polymer powder, wherein, the polymer powder adheres to printed regions of the substrate, and maintains coloring of the colored replicas;
   a remover constructed to remove the polymer powder from unprinted regions of the colored replicas;
   a stacker constructed to stack the colored replicas vertically on top of one-another in an order reflecting vertical positions of each slice in the object to create a replica stack;
   a fuser constructed to fuse together the polymer material in the replica stack;
   a remover constructed to remove any non-polymer material from the replica stack resulting in a physical colored three-dimensional object representative of the CAD model of the object.

2. The apparatus of claim 1, wherein the remover removes non-polymer material by abrasive blasting, chemical removal, dissolution, or chemical degradation.

3. The apparatus of claim 1, wherein, when a slice has a uniform boundary color, the interior of the slice is also printed with that color.

4. The apparatus of claim 1,
   wherein, the processor:
   (a) stores the logical slices as a plurality of bit maps;
   (b) colors the slices by assigning a color or gray scale to each pixel in the bit maps.

5. The apparatus of claim 4, wherein the processor further:
   extends boundary pixels in the bit maps to enlarge the boundaries to deal with process inaccuracies.

6. The apparatus of claim 1, where prior to slicing, the processor makes a scan of a model object to create the three-dimensional CAD model of the object, which comprises the steps of:
   (a) taking a CT scan of the model object to produce a three-dimensional CT image;
   (b) taking a plurality of photographs of the model object from different angles;
   (c) assembling the plurality of photographs in three dimensions wrapped around the three-dimensional CT image to produce the CAD model.

7. The apparatus of claim 1, wherein the printer couples to inkjet cartridges to print.

8. The apparatus of claim 4, wherein the bitmaps constructed from each slice are in Additive Manufacturing File Format.

9. The apparatus of claim 1, wherein the printer uses at least two inks: a first dark ink for black dots to decorate the object and a second clear ink for white or light areas, and wherein, the second ink is used for any parts of the object which are colorless, but nonetheless need to be filled with material.

10. The apparatus of claim 7,
    wherein, the inkjet cartridges comprise a plurality of colors that include black and clear.

11. The apparatus of claim 1 wherein, the substrate is non-woven carbon fiber.

12. The apparatus of claim, wherein the colored three-dimensional object comprises layers of material, and wherein the layers of material include residue of 2-Pyrrolidone.

13. The apparatus of claim 1, wherein the replica comprises a plurality of layers that comprise a hardened material, wherein the hardened material is a thermoplastic or thermosettable plastic.

14. The apparatus of claim 1, further comprising a fixture using registration holes to align the tiles.

15. The apparatus of claim 1, further comprising a container for removed powder and non-polymer material.

16. The apparatus of claim 1, wherein the colored three-dimensional object is a black and white, or a gray scale three-dimensional object.

17. The apparatus of claim 1, wherein the remover is a vacuum.

* * * * *